United States Patent [19]

Kerr

[11] 4,406,200

[45] Sep. 27, 1983

[54] TABLE EXTENSION FOR TABLE SAWS

[76] Inventor: William S. Kerr, 513½ N. Spaulding Ave., Los Angeles, Calif. 90036

[21] Appl. No.: 283,750

[22] Filed: Jul. 8, 1981

[51] Int. Cl.³ .......................... B23D 47/02; B23Q 1/04
[52] U.S. Cl. ..................................... 83/473; 83/477.2; 83/648; 83/859; 144/287
[58] Field of Search ...................... 83/477.2, 477, 473, 83/859, 701, 649, 648; 74/362, 373; 144/286 R, 286 A, 287; 108/65, 6

[56] References Cited

U.S. PATENT DOCUMENTS

| | | |
|---|---|---|
| 1,520,518 | 12/1924 | Thomason . |
| 1,848,475 | 3/1932 | Hackett . |
| 2,182,703 | 12/1939 | Rainwater . |
| 2,297,647 | 9/1942 | Chason . |
| 2,555,217 | 6/1948 | Young ................................ 144/286 |
| 2,607,651 | 8/1952 | Preuss . |
| 2,956,597 | 10/1960 | Leitchner . |
| 3,349,819 | 10/1967 | Koons . |
| 3,695,189 | 10/1972 | Felder ................................ 144/287 |
| 4,068,551 | 1/1978 | Kreitz ......................... 144/286 R X |
| 4,106,381 | 8/1978 | Kreitz . |
| 4,128,029 | 12/1978 | Gay et al. . |

FOREIGN PATENT DOCUMENTS 863546  1/1953  Fed. Rep. of Germany ........ 83/477

Primary Examiner—Robert E. Garrett
Assistant Examiner—Lawrence Meier
Attorney, Agent, or Firm—Trexler, Bushnell & Wolters, Ltd.

[57] ABSTRACT

A table extension for a table saw comprises a generally rectangular member extending from one end of the table, and a clamp for securing the member to a rail at that end of the table such that the top surface of the member and that of the table are substantially coplanar. A leg structure is secured to the underside of the member, which leg structure projects downwardly terminating in rollers which are adapted to engage a bearing plate on the saw table support. A pair of brace rods extend upwardly from the leg structure for engagement with a bottom plate on the underside of the extension.

8 Claims, 7 Drawing Figures

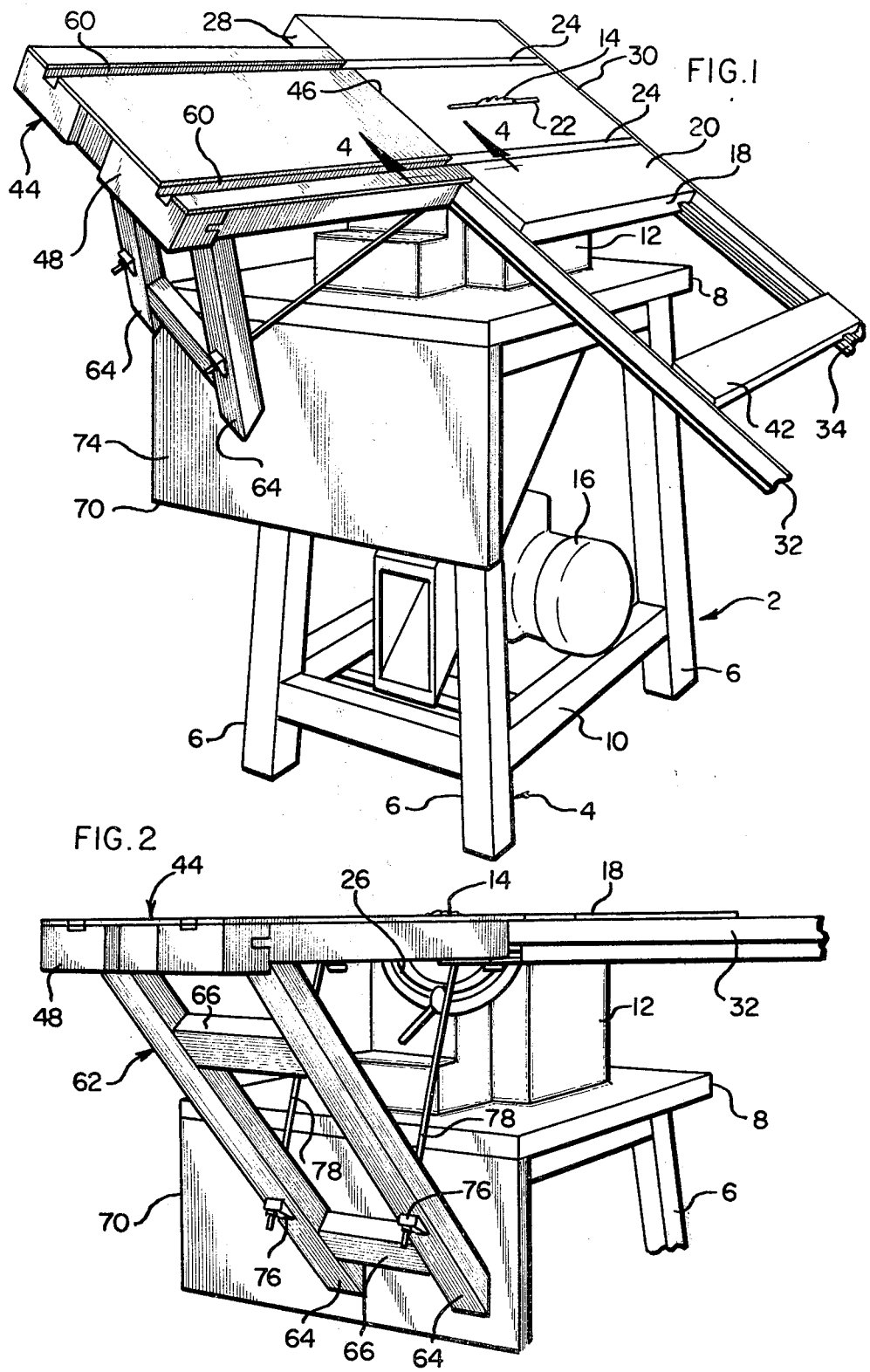

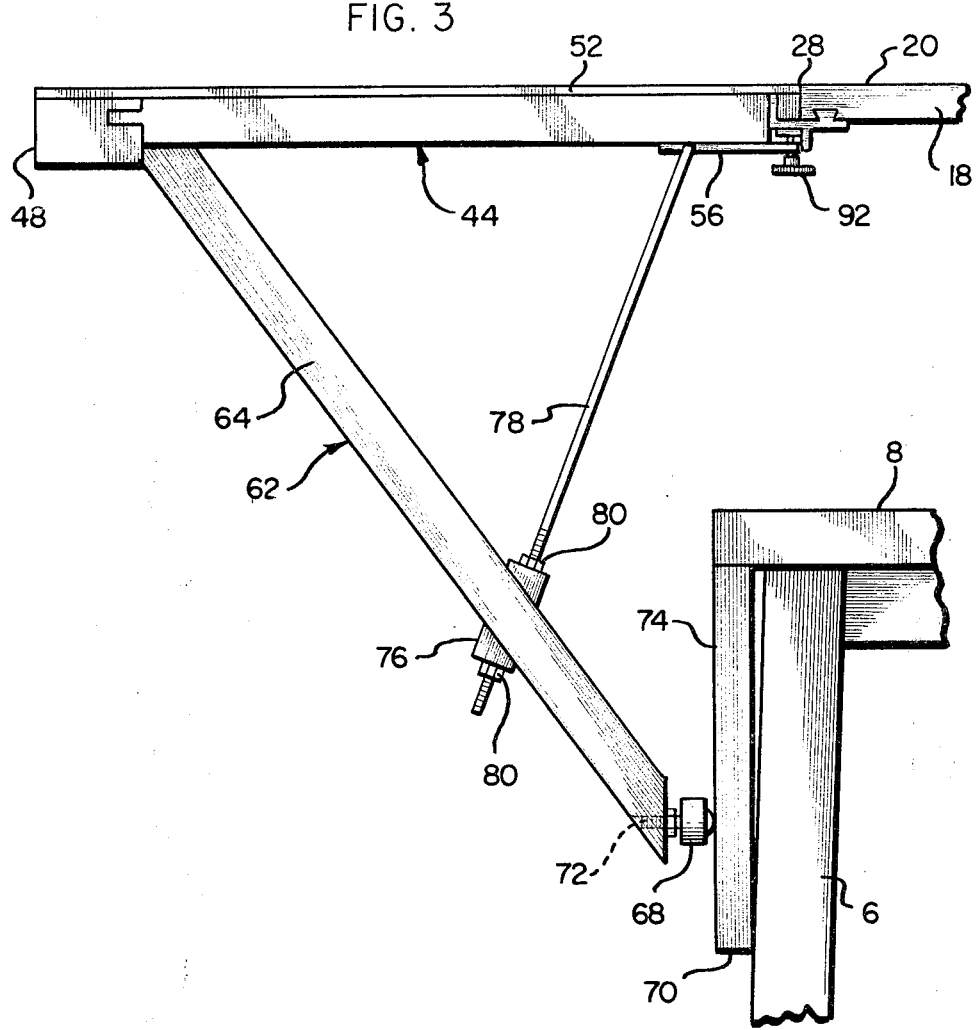
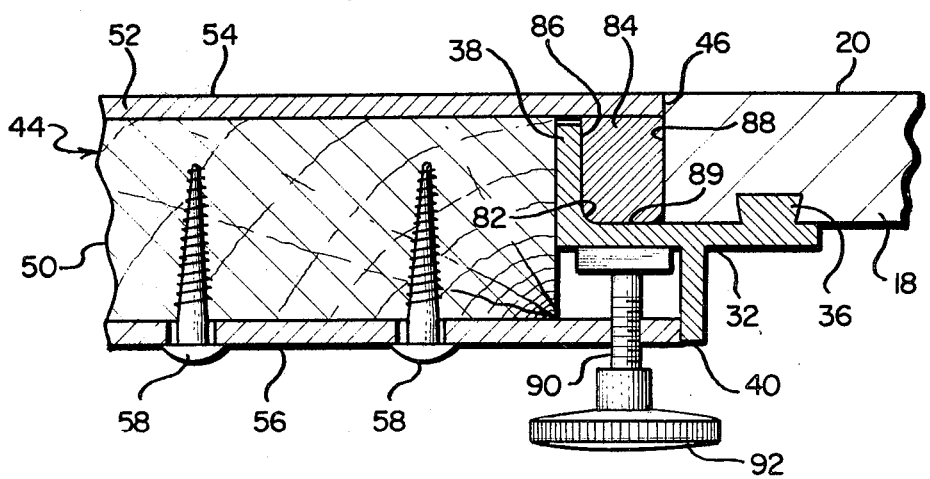

TABLE EXTENSION FOR TABLE SAWS

BACKGROUND OF THE INVENTION

This invention relates generally to improvements in table saws, and more particularly to a novel table extension which facilitates the support of comparatively long workpieces either at the feed end or at the discharge end of the saw table.

The type of table saw with which the present invention is concerned is of a type wherein the workpiece to be sawed is supported on the planar top of a work table and is fed into a rotating saw blade which extends upwardly through a slot in the top of the table. If the workpiece is unduly long it extends beyond the end of the table resulting in difficulty in holding or positioning the workpiece. In addition to being difficult to hold in place the workpiece becomes unstable, which may result in varying the location of the cut intended to be made. Furthermore, the instability of the large workpiece may be hazardous to the machine operator. Extensions for the table are generally known but none are believed to have the novel features of the present invention.

OBJECTS AND SUMMARY OF THE INVENTION

An object of this invention is to provide a novel table extension for a table saw that provides a solid support for wide or heavy pieces of material to be cut.

A further object of this invention is to provide a table extension of the type and for the purpose stated which is readily attached to an end of the table, and wherein the attaching arrangement is such as to align the top plane of the table with the top plane of the extension so that the two are coplanar.

A further object of this invention is to provide an extension of the type stated which when mounted on the table of the saw allows the table to be tilted in the normal manner without obstruction or impediment from the table extension.

In accordance with the foregoing objects the extension comprises a tabular (i.e. table-like) member having a top planar surface with opposed ends, clamping means adjacent to one of said ends for securing the tabular member to the table such that the top planar surface of the table and the top planar surface of the extension are generally coplanar and with one of the ends being at the margin of the table. There is also provided a leg structure which serves as a reinforcement and is secured to the tabular member at the end thereof that is distal from the table. The leg structure projects downwardly to form an acute angle with the tubular structure and terminates in antifriction rollers which are adapted to bear against a bearing plate carried by the upstanding support for the saw. Brace means may be secured to the leg structure above its lower end and extend upwardly so as to be attached to a bottom plate at the lower surface of that end of the extension that is proximate to the table.

In accordance with a further feature of the invention there are cooperating interfitting elements at the adjacent margins or ends of the table and extension respectively for clamping the extension and the table together. The cooperating means may comprise a channel and a block in the channel such that the engagement of the block and the channel serves to place the planar top of the table and of the extension in coplanar relationship. The engaging faces of the block and of the channel form force-receiving regions resisting deflection of the table extension under load, thereby to provide a rugged and durable support for the workpiece. Clamping means in the form of hand-operated screws draw the block tightly into the channel to form a rigid clamping arrangement.

BRIEF DESCRIPTION OF THE FIGURES

FIG. 1 is a perspective view of a table saw having attached thereto an extension constructued in accordance with and embodying the present invention and showing the table and extension in a tilted position;

FIG. 2 is a fragmentary perspective view of the saw of FIG. 1 and showing the table in horizontal position;

FIG. 3 is a fragmentary side-elevational view on an enlarged scale of a part of the structure of FIG. 2;

FIG. 4 is a fragmentary sectional view on an enlarged scale taken approximately along line 4—4 of FIG. 1;

DETAILED DESCRIPTION

Figure 5:
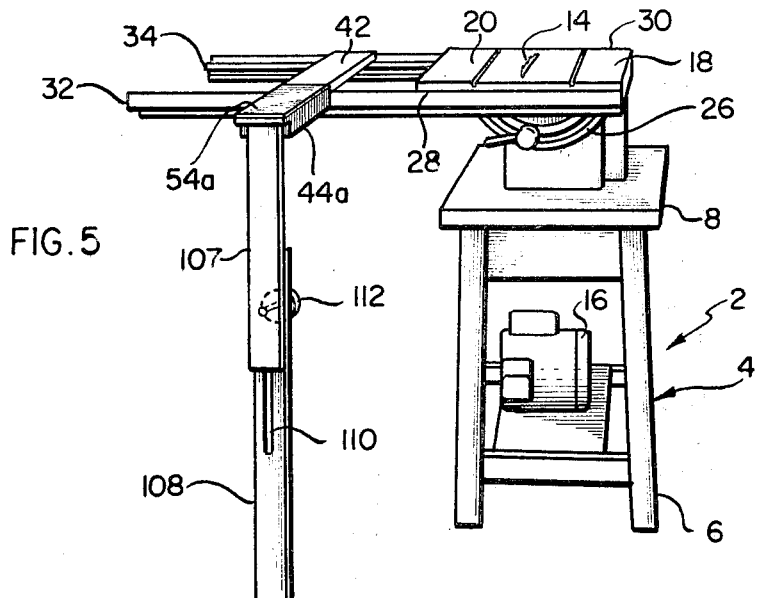
FIG. 5 is a perspective view of another form of the invention.

Referring now in more detail to the drawing there is shown a table saw 2 having an upstanding support 4 which may include a plurality of legs 6 that support an upper sub-table 8 and a bottom frame 10. Mounted on the sub-table 8 is a housing 12 for rotatably supporting a circular saw blade 14 in a known manner, the blade 14 being belt driven by an electric motor 16 that is mounted on the bottom frame 10.

Also mounted on the housing 12 is a tiltable saw table 18 having a top substantially planar surface 20. This top surface 20 is preferably generally rectangular in configuration and has a slot 22 through which the saw blade projects. Conventionally, the top surface 20 may have one or more grooves 24 that are parallel to the slot 22 for receiving conventional miter gauge rods or like accessories to be used in conjunction with the saw. Typically, the table 18 is tiltable about an axis passing through the plane of the blade 14. The mechanism for tilting the saw table is known and may include a clamp assembly 26 by which the table may be held in any tilted position as selected by the user of the saw.

The workpiece to be sawed is fed into the saw blade in the direction generally along the length of the slot 22. There is thus provided a work-in end or margin 28 and a work-out or discharge margin 30, both normal to the slot 22. At each margin 28 or 30, as the case may be, there is provided a rail 32 or 34 to which the table extension, hereinafter more fully described, may be attached. Each rail comprises a dovetail member 36 that fits into matint slot on the underside of the table 18. As best seen in FIG. 4, the rail is formed at one end with an upstanding flange 38, and intermediate the flange 38 and the dovetail 36 is a depending reinforcing web 40. As seen in FIG. 1, parallel rails 32, 34 extend to one side of the table 18 and may be joined by a cross piece 42.

Provided for mounting on either rail 32 or 34 is a table extension generally designated at 44. The table extension is a flat tabular member having opposed margins 46, 48 which are respectively proximate to and distal from the table 18. The extension comprises a wooden body 50 and a metallic top plate 52 having a top surface 54 that is adapted to be positioned in coplanar relationship with the top surface 20 of the table 18. The extension also includes a short bottom plate 56 near the margin 46. The bottom plate 56 may be secured in place by screws 58 while the top plate 52 may be bonded or otherwise secured to the wood body 50. Furthermore, and as best seen in FIG. 1, there are slots 60, 60 in the extension that are adapted to line up with slots 24, 24 respectively in the table 18. The slots 60, 60 are formed in the wood body 50, thus dividing the top plate 52 into a plurality of sections.

Adjacent to the distal end 48 is a reinforcing leg-like structure 62 having depending parallel members 64, 64 that are joined by cross braces 66, 66. The lower or free ends of the members 64, 64 are provided with anti-friction means such as rollers 68 which are adapted to engage a bearing plate 70. This bearing plate 70 is mounted on the upper part of the support 4 just below the sub-table 8. As seen in FIG. 3, each roller 68 may be mounted on a screw 72 whereby the position of the roller 68 may be adjusted so that contact may be made with the generally vertical surface 74 of the bearing plate 70. The arrangement aids in rigidifying the attachment assembly to maintain the top surface 54 in coplanar relationship with the top surface 20 of the table. Mounted in each leg 64 is a block 76 into which the threaded end of a brace rod 78 is inserted. The brace rods 78, 78 extend upwardly for suitable pivotal attachment to the bottom plate 56. Adjusting nuts 80, 80 at opposite ends of the block 76 adjust the effective length of the upwardly extended part of each brace rod 78.

The arrangement for clamping the extension 44 to the table is best shown in FIG. 4. The rail flange 38 and the adjacent edge of the table cooperate to form a channel 82 for receiving a block 84 that is secured to and depends from the plate 52. The block 84 and the channel 82 have opposed sets of faces at 86 and 88 respectively which are substantially flush fitting. The block 84 and the bottom surface of the channel 82 provide flush fitting intermediate faces 89. In effect, therefore, the block 84 in cooperation with the channel 82 provides an arrangement assuring that the surfaces 20 and 54 may be maintained coplanar when the extension 44 is attached to the table. The cooperating surfaces at 86 and 88 provide force-receiving regions that resist deflection of the extension under load. The engagement of the edge of the bottom plate 56 with the web 40 also aids in aligning or leveling the extension with the saw table.

A suitable clamping means such as studs 90 are threaded through the bottom plate 56 for clamping engagement with the underside of the rail in the region of the channel 82. Each stud 90 may have a handle 92 to facilitate manipulation thereof. As will be apparent from FIG. 4, tightening down on the stud 90 will draw the rail and block 84 tightly together. Nevertheless, the studs 90 may be readily unthreaded when it is desired to remove the extension from the saw. Furthermore, the engagement of the rollers 68 and the bearing plate 70 provides support for the lower ends of the members 64 in various tilted positions of the saw. At the same time the anti-friction characteristics of the rollers 68 do not substantially impair movement of the saw table and extension to various tilted positions.

Figure 6:
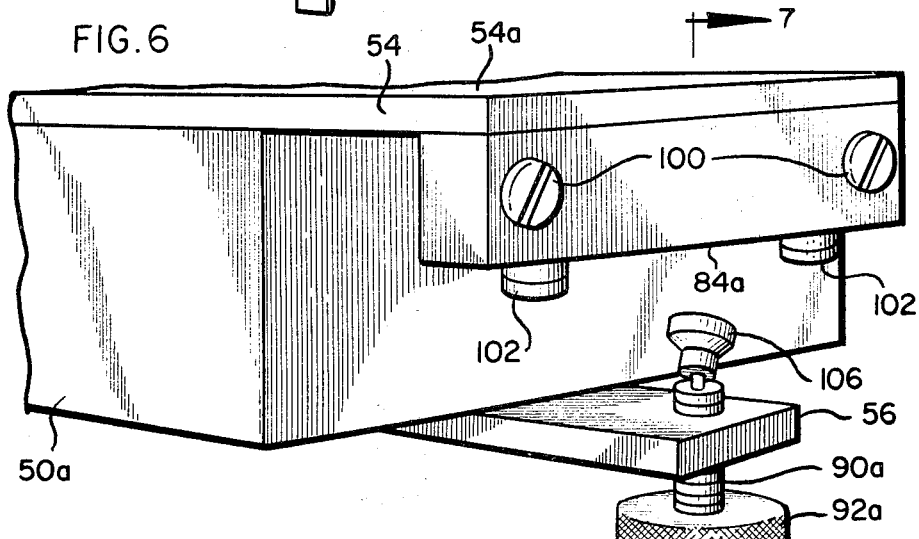
FIG. 6 is a fragmentary perspective view on an enlarged scale of a part of the structure of FIG. 5.
Figure 7:
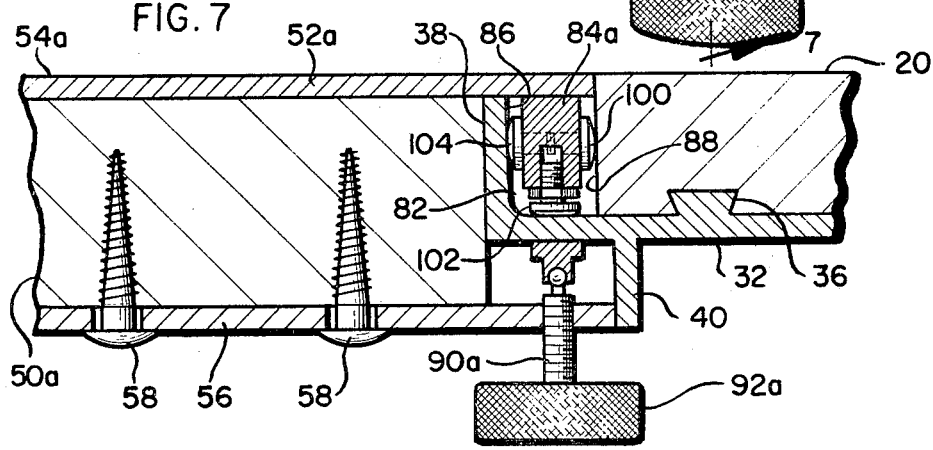
FIG. 7 is a fragmentary sectional view taken along line 7—7 of FIG. 6.

A modified form of the invention is shown in FIGS. 5-7 wherein like reference numerals refer to like parts in the embodiment of the invention in FIGS. 1-4. Furthermore, corresponding or similar parts in FIGS. 5-7 are designated by the appropriate reference numeral with the addition of the letter "a". The form of the invention in FIG. 5-8 is intended to be used primarily where the table and the extension have their planar tops in a horizontal position.

The table extension 44a is shown mounted on the rail 32 adjacent to the cross-piece 42, although the extension 44a might also be mounted immediately adjacent to the table proper 18. As best shown in FIG. 5, the end of the extension proper that is remote from the rail 32 has a depending leg structure 107 that includes a lower adjustable leg member 108. This leg member 108 has a vertical slot 110 through which a hand-operated screw and nut assembly 112 projects, the screw also projecting through the upper leg member. Consequently, the length of the leg structure 107 may be adjusted so that the lower section 108 touches the floor, the hand nut of the assembly 112 being used to lock releasably the leg sections in their positions of selected adjustment. Moreover, it is possible to raise the leg section 106 should it be desired to use the table in its tilted position without the necessity of removing the extension 44a.

The spacer block 84a is similar to the spacer block 84. However, the spacer block 84 has threaded therein opposed nylon screws 100, 100 on one face and like pair of screws 104, 104 on the opposite face. These screws engage the respective proximate surfaces of the channel 82 such as at surfaces 86 and 88. Furthermore the downwardly presented surface of the block 84a has nylon screw and nut assemblies 102, 102 which are adjustable so as to aid in leveling the surface 54 of the extension with the adjacent surface 20 (or 42) of the saw table.

In the clamping arrangement of FIG. 7 the threaded stud 90a includes a handle 92a. The inner end of the stud 90a includes a swivel fitting 108 which is adapted to apply pressure to the bottom of the channel 82 when the screw 90a tightened.

The invention claimed as follows:

1. In a table saw having an upstanding support, a table tiltable on said support, a top surface on said table, said table having a new blade slot and opposed work feed-in and work discharge ends that are perpendicular to said slot, a table extension projecting from one of said ends in the path of movement of the work and having a top surface that is coplanar with the top surface of the table and remains so as to the table is tilted, releasable clamping means securing said table and extension together, reinforcing structure secured to said extension adjacent to the end thereof that is distal to said table, said structure projecting from the underside of said extension toward said support and having anti-friction means, and a bearing plate on said support and engaging said anti-friction means in the various tilted positions of said table and extensions.

2. An extension according to claim 1, in which said anti-friction means are rollers.

3. In a table saw according to claim 1 said anti-friction means being rollers adjustable toward and away from said bearing plate.

4. In a table saw according to claim 1, said reinforcing structure including a leg structure projecting from the underside of said table extension adjacent to the end thereof that is distal to said table, and brace means secured to said leg structure above its lower end and extending upwardly and being attached to said table extension.

5. An extension according to claim 4 in which said brace means comprises a pair of rods, and means for varying the effective lengths of said rods between said leg structure and said table extension.

6. In a table saw according to claim 1 wherein said tiltable table has a margin adjacent said projecting table extension, and wherein said clamping means incudes cooperating interfitting elements at said margin and on said extension for clamping the extension and table together; said cooperating means comprising means forming a channel, a block on said channel such that engagement of the block and channel serves to align said planar tops in coplanar relationship and opposed faces of the block and channel engage to form force-receiving regions resisting deflection of said extension under load, and clamping means for drawing said channel-forming means and said block tightly together.

7. In a table saw according to claim 6, the channel and block having intermediate engaging surfaces at the bottom of the channel and said clamping means comprises a threaded member having an axis of rotation normal to said intermediate surfaces.

8. In a table saw according to claim 7, said extension comprising a top plate and a bottom plate, the top plate carrying said block and the bottom plate receiving said threaded member.

* * * * *

UNITED STATES PATENT AND TRADEMARK OFFICE
CERTIFICATE OF CORRECTION

PATENT NO. : 4,406,200
DATED : September 27, 1983
INVENTOR(S) : William S. Kerr

It is certified that error appears in the above-identified patent and that said Letters Patent is hereby corrected as shown below:

Column 4, line 41, change "new" to --saw--.

Column 4, line 54, change "extensions" to --extension--.

Signed and Sealed this

Seventeenth Day of January 1984

[SEAL]

Attest:

GERALD J. MOSSINGHOFF

Attesting Officer  Commissioner of Patents and Trademarks